UNITED STATES PATENT OFFICE.

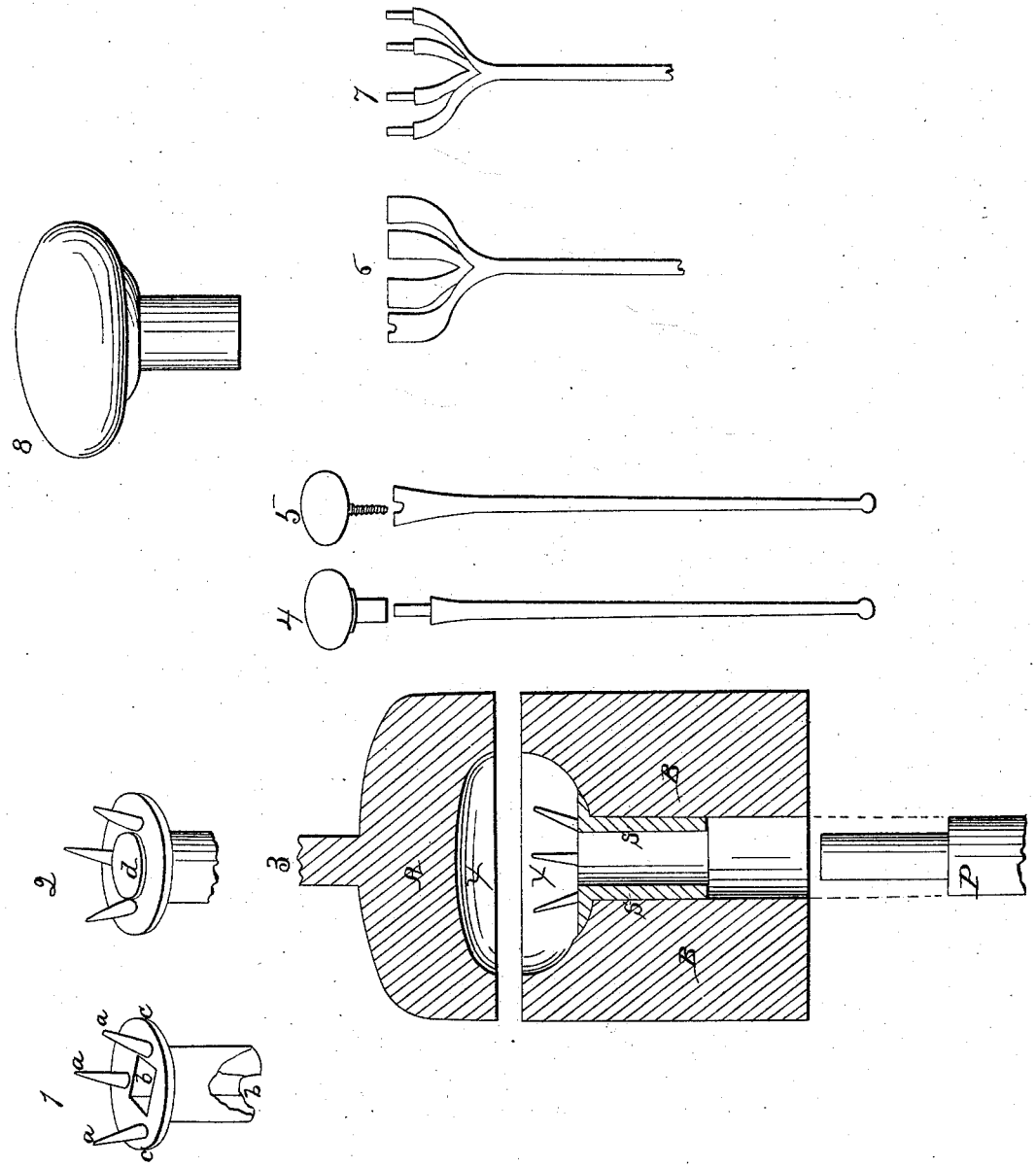

BENJ. NOTT, OF BETHLEHEM, NEW YORK, ASSIGNOR TO JOHN P. PEPPER, OF ALBANY, NEW YORK.

MANUFACTURE OF DOOR-KNOBS.

Specification of Letters Patent No. 8,795, dated March 9, 1852.

*To all whom it may concern:*

Be it known that I, BENJAMIN NOTT, of the town of Bethlehem, in the county of Albany, State of New York, have invented certain Improvements in the Manufacture of Vitreous Metal Knobs for Doors, Commodes, &c., Together with the Tools for Executing such Improvements; and I declare the following specification, with the drawings thereto attached as part of the same, to be a full and perfect description thereof.

To explain the value of my improvements, it will be necessary to describe generally the manufacture of vitreous-metal knobs, for which purpose I will describe the processes originally employed in the manufacture of argillo knobs.

A socket of iron, of the form shown in Figure 1, is prepared. This socket, it will be seen, has on its upper edge, three diverging points of metal, *a a a* and through its length a square mortise *b, b*, open at each end. It has also formed around its upper end a collar or flange of metal *c, c*. This socket is placed in the lower part of a mold, as shown in a vertical section in Fig. 3. This mold is of metal and is shaped so, that when the upper part A, and lower part B, are closed upon each other the hollow space X, closed between them, is the shape of the knob to be made. The upper part closes down upon the lower part, and is thrown up and open, for the purpose of introducing the socket above described. The socket is shown in section in the mold *s s* where the socket is in its place, and the mold open. A small ball of the material in a state of fusion is taken up, on a metal rod, from the melting pot, and so much of it is dropped upon the upper edge of the socket as will fill a mold and make a knob. This done, the top of the mold is brought down and pressed upon the metal, giving the knob the shape of the mold, and closing the melted material around the metal points in the top of the socket. This makes a knob, as shown at Fig. 8, but which has by the sudden chill a rough, unfinished exterior surface. This is the first process.

In order to give this knob a polished appearance it is taken from the mold and placed in a long handled pincers which holds it by the socket or shank. By this the knob is then thrust into a furnace through an opening in its side prepared for that purpose, where it is turned rapidly around, the whole surface of the knob being thus exposed to intense heat which fuses the surface of the material and leaves it in a highly polished state. This is the second process called flashing. The knob after having been polished is carried to the annealing oven.

In carrying out the first process, it is obvious, that the pressure of the mold would force the fused material into the hollow of the socket, filling up the space which is intended for the spindle, when the knob is fitted to locks. To obviate this a composition of sand and other materials intended to serve as a core, was made, and the socket filled therewith, which was then dried before it was placed in a mold and when the knob was completed, this core or composition was picked out from the socket, a troublesome and expensive process. To obviate this process, and for the general purpose of facilitating the centering and adjustment of the socket, I have inserted in the lower part of the mold a metal plug just large enough to occupy the entire space of the socket, see Fig. 3, where the plug P is represented just below the mold ready for insertion by raising it up through the bottom of the mold. This plug effectually prevents the metal from entering the socket and leaves it perfectly clear of obstructions from end to end.

In place of the pincers or polishing rod used in the second or flashing process I have invented and substituted a polishing rod capable of polishing several knobs simultaneously and by one operation. Fig. 7, is a correct representation of this rod, which consists of several arms or projections, radiating from the extremity or any convenient distance from the extremity of a common handle. These projections are of equal lengths, with their extremities at equal distances from the line of the axis of the handle. The points of these projections are shaped and fitted to enter into the sockets of the knobs, and the several knobs being held by these points, and made to revolve in the same identical circle, are all subjected simultaneously to the same identical manipulations and calorific treatment.

Commode knobs are made by substituting for the socket used in the door knob, a common wood screw of suitable size which is placed in the mold so that its head may be enveloped in the fused material. To accommodate them in the flashing operations, the rod is made with the point, or points as suggested by Figs. 5 and 6.

I claim substantially as set forth in the above specification in the manufacture of vitreous-metal knobs and similar articles—

1. The application and use of a metal plug to be entered into the socket and filling it, the plug passing up from or through the bottom of the mold for the purpose of preventing the melted material from filling the socket, during the pressing operations and at the same time facilitating the centering and adjustment of the socket.

2. I claim, the invention of and substitution in the place of pincers and polishing rods heretofore known, a polishing rod capable of polishing several knobs simultaneously and by one operation, substantially as above described.

BENJAMIN NOTT.

Witnesses:
HORACE CHAMBERS,
RICHD. McCABE.